United States Patent
Lanni

(10) Patent No.: US 8,354,760 B2
(45) Date of Patent: Jan. 15, 2013

(54) POWER SUPPLY EQUIPMENT TO SIMULTANEOUSLY POWER MULTIPLE ELECTRONIC DEVICE

(75) Inventor: Thomas W. Lanni, Laguna Niguel, CA (US)

(73) Assignee: Comarco Wireless Technologies, Inc., Lake Forest, CA (US)

( * ) Notice: Subject to any disclaimer, the term of this patent is extended or adjusted under 35 U.S.C. 154(b) by 455 days.

(21) Appl. No.: 12/607,857

(22) Filed: Oct. 28, 2009

(65) Prior Publication Data

US 2011/0095605 A1  Apr. 28, 2011

(51) Int. Cl.
*H02J 3/46* (2006.01)
(52) U.S. Cl. .......... 307/24; 363/142; 363/146; 439/338; 439/339
(58) Field of Classification Search ............ 307/24, 307/26–28, 72–76, 128; 363/131, 142, 146; 439/338–340, 505, 660
See application file for complete search history.

(56) References Cited

U.S. PATENT DOCUMENTS

| | | |
|---|---|---|
| 339,103 A | 3/1886 | Hussey |
| 359,474 A | 3/1887 | Smith |
| 375,936 A | 1/1888 | Harwood |
| 391,227 A | 10/1888 | Buckman |
| 1,741,265 A | 12/1929 | Wappler |
| 2,427,111 A | 9/1947 | Tolmie |
| 2,792,559 A | 5/1957 | Maberry |
| 3,048,805 A | 8/1962 | Berni |
| 3,049,687 A | 8/1962 | Berni |
| 3,111,641 A | 11/1963 | Wilentchik |
| 3,201,617 A | 8/1965 | Pacoroni et al. |
| 3,256,466 A | 6/1966 | Trolio et al. |
| 3,275,855 A | 9/1966 | Wright |
| 3,281,747 A | 10/1966 | Winsand |
| 3,452,215 A | 6/1969 | Alessio |
| 3,484,864 A | 12/1969 | Bernstein et al. |

(Continued)

FOREIGN PATENT DOCUMENTS

EP   1001513 A2   5/2000

(Continued)

OTHER PUBLICATIONS

Press Release of Empire Engineering, Electronic Design and Management, Jul. 5, 1995—San Luis Obispo, CA USA, pp. 1-2.

(Continued)

*Primary Examiner* — Rexford Barnie
*Assistant Examiner* — Alfonso Perez Borroto
(74) *Attorney, Agent, or Firm* — Pillsbury Winthrop Shaw Pittman LLP

(57) ABSTRACT

Power supply equipment includes low power assemblies and high power assemblies, each of which is detachably mateable to either one of two power ports. To simultaneously power two low power devices, low power assemblies are respectively mated to each of the power ports. To simultaneously power one low power and one high power device, a low power assembly is mated to one of the power ports and a high power assembly is mated to the other power port. The low power assemblies transfer a low DC voltage, but not a high DC voltage, to low power devices. The high power assemblies transfer a high DC voltage, but not a low DC voltage, to high power devices. If a high power assembly is mated to each of the power ports, power flow is interrupted without putting the power supply in an overvoltage or overcurrent condition.

19 Claims, 5 Drawing Sheets

U.S. PATENT DOCUMENTS

| | | | |
|---|---|---|---|
| 3,581,480 A | 6/1971 | O'Conner et al. | |
| 3,659,188 A | 4/1972 | Alexander et al. | |
| 3,784,956 A | 1/1974 | Gassman | |
| 3,870,946 A | 3/1975 | Sandorf | |
| 3,996,546 A | 12/1976 | Hugly | |
| 4,021,933 A | 5/1977 | Hughes | |
| 4,083,246 A | 4/1978 | Marsh | |
| 4,089,041 A | 5/1978 | Lockard | |
| 4,116,524 A | 9/1978 | DeNigris et al. | |
| 4,164,665 A | 8/1979 | Berger | |
| 4,220,834 A | 9/1980 | Holce et al. | |
| 4,239,319 A | 12/1980 | Gladd et al. | |
| 4,257,089 A | 3/1981 | Ravis | |
| 4,258,969 A | 3/1981 | Stallard | |
| 4,297,623 A | 10/1981 | Dupont | |
| 4,307,441 A | 12/1981 | Bello | |
| 4,342,563 A | 8/1982 | Campbell | |
| 4,368,942 A | 1/1983 | Mathe et al. | |
| 4,442,382 A | 4/1984 | Fleck | |
| 4,569,009 A | 2/1986 | Genuit | |
| 4,622,627 A | 11/1986 | Rodriguez et al. | |
| 4,709,160 A | 11/1987 | Kinoshita | |
| 4,713,601 A | 12/1987 | Zahm et al. | |
| 4,713,642 A | 12/1987 | Wolfe et al. | |
| 4,734,839 A | 3/1988 | Barthold | |
| 4,747,034 A | 5/1988 | Dickey | |
| 4,764,129 A | 8/1988 | Jones et al. | |
| 4,820,204 A | 4/1989 | Batty | |
| 4,829,224 A | 5/1989 | Gandelman et al. | |
| 4,860,185 A | 8/1989 | Brewer et al. | |
| 4,885,674 A | 12/1989 | Varga et al. | |
| 4,890,214 A | 12/1989 | Yamamoto | |
| 4,900,885 A | 2/1990 | Inumada | |
| 4,912,392 A | 3/1990 | Faulkner | |
| 4,924,067 A | 5/1990 | Wilhelmson | |
| 4,963,802 A | 10/1990 | Gross et al. | |
| 4,990,099 A | 2/1991 | Marin et al. | |
| 4,997,393 A | 3/1991 | Armando | |
| 5,006,695 A | 4/1991 | Elliott | |
| 5,007,863 A | 4/1991 | Xuan | |
| 5,019,954 A | 5/1991 | Bourgeault et al. | |
| 5,040,990 A | 8/1991 | Suman et al. | |
| 5,044,964 A | 9/1991 | Minerd et al. | |
| 5,084,666 A | 1/1992 | Bolash | |
| 5,089,768 A | 2/1992 | Sato | |
| 5,092,788 A | 3/1992 | Pristupa, Jr. et al. | |
| 5,127,844 A | 7/1992 | Leman et al. | |
| 5,146,394 A | 9/1992 | Ishii et al. | |
| 5,147,226 A | 9/1992 | Kile | |
| 5,170,067 A | 12/1992 | Baum et al. | |
| 5,177,431 A | 1/1993 | Smith et al. | |
| 5,177,675 A | 1/1993 | Archer | |
| 5,181,859 A | 1/1993 | Foreman et al. | |
| 5,184,291 A | 2/1993 | Crowe et al. | |
| 5,233,509 A | 8/1993 | Ghotbi | |
| 5,245,220 A | 9/1993 | Lee | |
| 5,259,800 A | 11/1993 | Fields | |
| 5,290,191 A | 3/1994 | Foreman et al. | |
| 5,295,058 A | 3/1994 | McGreevy | |
| 5,309,348 A | 5/1994 | Leu | |
| 5,326,283 A | 7/1994 | Chen | |
| 5,333,177 A | 7/1994 | Braitberg et al. | |
| 5,347,211 A | 9/1994 | Jakubowski | |
| 5,369,352 A | 11/1994 | Toepfer et al. | |
| 5,412,248 A | 5/1995 | Murari et al. | |
| 5,414,610 A | 5/1995 | Brainard | |
| 5,417,585 A | 5/1995 | Morin et al. | |
| 5,428,288 A | 6/1995 | Foreman et al. | |
| 5,449,302 A | 9/1995 | Yarbrough et al. | |
| 5,455,734 A | 10/1995 | Foreman et al. | |
| 5,471,117 A | 11/1995 | Ranganath et al. | |
| 5,479,331 A | 12/1995 | Lenni | |
| 5,499,187 A * | 3/1996 | Smith | 363/142 |
| 5,510,691 A | 4/1996 | Palatov | |
| 5,532,524 A | 7/1996 | Townsley et al. | |
| 5,570,002 A | 10/1996 | Castleman | |
| 5,602,462 A | 2/1997 | Stich et al. | |
| 5,621,299 A | 4/1997 | Krall | |
| 5,636,110 A | 6/1997 | Lanni | |
| 5,648,712 A | 7/1997 | Hahn | |
| 5,672,951 A | 9/1997 | Shiota | |
| D391,227 S | 2/1998 | Dickey | |
| 5,714,805 A | 2/1998 | Lobaugh | |
| 5,715,153 A | 2/1998 | Lu | |
| 5,715,156 A | 2/1998 | Yilmaz et al. | |
| 5,731,693 A | 3/1998 | Furmanczyk | |
| 5,733,674 A | 3/1998 | Law et al. | |
| 5,739,672 A | 4/1998 | Lane | |
| 5,739,673 A | 4/1998 | Le Van Suu | |
| 5,770,895 A | 6/1998 | Kumasaka | |
| 5,773,961 A | 6/1998 | Cameron et al. | |
| 5,790,896 A | 8/1998 | Nguyen | |
| 5,801,513 A | 9/1998 | Smith et al. | |
| 5,801,881 A | 9/1998 | Lanni et al. | |
| 5,822,200 A | 10/1998 | Stasz | |
| 5,838,110 A | 11/1998 | Pezzani | |
| 5,838,554 A | 11/1998 | Lanni | |
| 5,847,541 A | 12/1998 | Hahn | |
| 5,861,732 A | 1/1999 | Takimoto et al. | |
| 5,864,221 A | 1/1999 | Downs et al. | |
| 5,886,422 A | 3/1999 | Mills | |
| 5,901,056 A | 5/1999 | Hung | |
| 5,929,597 A | 7/1999 | Pfeifer et al. | |
| 5,949,213 A | 9/1999 | Lanni | |
| 5,977,747 A | 11/1999 | Huang | |
| 5,982,652 A | 11/1999 | Simonelli et al. | |
| 6,055,097 A | 4/2000 | Lanni et al. | |
| 6,064,177 A | 5/2000 | Dixon | |
| 6,071,156 A | 6/2000 | Platzer et al. | |
| 6,080,022 A | 6/2000 | Shaberman et al. | |
| 6,091,611 A | 7/2000 | Lanni | |
| 6,135,831 A | 10/2000 | Lanni et al. | |
| 6,137,280 A | 10/2000 | Ackermann et al. | |
| 6,152,792 A | 11/2000 | Lanni et al. | |
| 6,160,873 A | 12/2000 | Truong et al. | |
| 6,172,884 B1 | 1/2001 | Lanni | |
| 6,194,875 B1 | 2/2001 | Takimoto et al. | |
| 6,225,708 B1 | 5/2001 | Furukawa et al. | |
| 6,238,257 B1 | 5/2001 | Platzer et al. | |
| 6,257,932 B1 | 7/2001 | Neely | |
| 6,266,261 B1 | 7/2001 | Lanni | |
| 6,297,972 B1 | 10/2001 | Chen | |
| 6,302,726 B1 | 10/2001 | Marechal | |
| 6,307,757 B1 | 10/2001 | Porter et al. | |
| 6,361,355 B1 | 3/2002 | Matsuoka et al. | |
| 6,382,842 B1 | 5/2002 | Arima et al. | |
| 6,418,791 B1 | 7/2002 | Lanni et al. | |
| 6,456,184 B1 | 9/2002 | Vu et al. | |
| 6,473,961 B1 | 11/2002 | Segal et al. | |
| 6,540,549 B2 | 4/2003 | Rupert | |
| 6,650,560 B2 | 11/2003 | MacDonald et al. | |
| 6,670,797 B2 | 12/2003 | Johanning | |
| 6,678,178 B2 | 1/2004 | Lipcsei | |
| 6,693,413 B1 | 2/2004 | Lanni | |
| 6,700,808 B2 | 3/2004 | MacDonald et al. | |
| 6,707,284 B2 | 3/2004 | Lanni | |
| 6,731,844 B2 | 5/2004 | Conrad et al. | |
| 6,746,279 B1 | 6/2004 | Lopez | |
| 6,809,943 B2 | 10/2004 | Lanni | |
| 6,831,848 B2 | 12/2004 | Lanni | |
| 6,836,101 B2 | 12/2004 | Lanni | |
| 6,850,423 B2 | 2/2005 | Lanni | |
| 6,855,284 B2 | 2/2005 | Lanni et al. | |
| 6,922,347 B2 | 7/2005 | Lanni | |
| 6,929,516 B2 | 8/2005 | Brochu et al. | |
| 6,937,490 B2 * | 8/2005 | MacDonald et al. | 363/142 |
| 6,939,150 B1 | 9/2005 | Lanni | |
| 6,950,000 B1 | 9/2005 | Lanni et al. | |
| 6,976,885 B2 | 12/2005 | Lord | |
| 7,035,126 B1 | 4/2006 | Lanni | |
| 7,053,742 B2 | 5/2006 | Lanni et al. | |
| 7,056,149 B1 | 6/2006 | Lanni | |
| 7,072,200 B2 | 7/2006 | Lanni | |
| 7,142,423 B2 | 11/2006 | Lanni | |
| 7,144,222 B2 | 12/2006 | Lanni | |
| 7,145,312 B2 | 12/2006 | Lanni | |
| 7,145,787 B2 | 12/2006 | Lanni | |

| | | |
|---|---|---|
| 7,148,659 B2 | 12/2006 | Lanni |
| 7,153,169 B2 | 12/2006 | Lord |
| 7,193,398 B2 | 3/2007 | Lanni |
| 7,193,873 B2 | 3/2007 | Lanni |
| 7,224,086 B2 * | 5/2007 | Germagian et al. .......... 307/128 |
| 7,245,515 B2 * | 7/2007 | Chiang ........................ 363/146 |
| 7,254,048 B2 | 8/2007 | Lanni |
| 7,258,572 B2 * | 8/2007 | Milan ........................... 439/502 |
| 7,265,973 B2 | 9/2007 | Lanni |
| 7,266,003 B2 | 9/2007 | Lanni |
| 7,279,868 B2 | 10/2007 | Lanni |
| 7,355,851 B2 | 4/2008 | Lanni |
| 7,365,524 B2 | 4/2008 | Lanni |
| 7,416,086 B2 | 8/2008 | Lanni |
| 7,420,823 B2 | 9/2008 | Lanni |
| 7,434,793 B2 | 10/2008 | Lanni |
| 7,450,390 B2 | 11/2008 | Lanni |
| 7,450,403 B2 | 11/2008 | Lanni |
| 7,453,171 B2 | 11/2008 | Lanni |
| 7,460,381 B2 | 12/2008 | Lanni |
| 7,489,116 B2 | 2/2009 | Lanni |
| 7,495,941 B2 | 2/2009 | Lanni |
| 7,642,671 B2 | 1/2010 | Mahaffey |
| 7,701,739 B2 * | 4/2010 | Mollo ........................... 363/142 |
| 2001/0030879 A1 | 10/2001 | Greenfeld et al. |
| 2002/0067630 A1 | 6/2002 | Tokunaga et al. |
| 2002/0070702 A1 | 6/2002 | Ragnarsson |
| 2002/0071290 A1 | 6/2002 | Youn et al. |
| 2004/0227635 A1 * | 11/2004 | Sabatino ....................... 340/618 |
| 2005/0151506 A1 * | 7/2005 | Kennedy et al. .............. 320/111 |
| 2005/0173989 A1 | 8/2005 | Wu |
| 2005/0197018 A1 | 9/2005 | Lord |
| 2006/0007715 A1 | 1/2006 | MacDonald et al. |
| 2006/0082934 A1 * | 4/2006 | Price et al. ...................... 361/18 |
| 2007/0263703 A1 * | 11/2007 | Mahaffey ...................... 375/142 |
| 2009/0021189 A1 | 1/2009 | DuBose et al. |
| 2009/0167083 A1 | 7/2009 | Kuo et al. |
| 2010/0090531 A1 | 4/2010 | Mahaffey |

FOREIGN PATENT DOCUMENTS

| | | |
|---|---|---|
| EP | 1107437 A2 | 6/2001 |
| EP | 1122873 A2 | 8/2001 |
| EP | 1 942 562 A2 | 7/2008 |
| WO | WO 2005/015721 A1 | 2/2005 |

OTHER PUBLICATIONS

Description of the "Smart Adapter System", NESCO Battery Systems, pp. 1-2.
Lu Carey: MacWorld "On the Road", vol. 12, No. 7, Jul. 1995, pp. 141-142, 5/9/1 (Item 1 from file: 15) Dialog(r) File 15:ABI/Inform(r).
Data Sheet for Benchmarq Model BQ2002C, Fast-Charge IC, Sep. 1997, 8 pgs.
Data Sheet for Benchmarq Model BQ2954, Lithium Ion Fast-Charge IC, Nov. 1997, 14 pgs.
"Portable Computers Fly High in the Sky with Airline Seat Power," [on-line], Nov. 18, 1996 [retrieved Feb. 13, 2001], pp. 1-2, retrieved from Internet: http://www.roadwarrior.com/xtend/news/pressurereleases/pr-961118.html.
"New PowerXtenders Adapter Lets Portable Computer Users Plug Into Computing Power on Airplanes and in Cars," [on-line], Apr. 30, 1997, [retrieved Feb. 13, 2001], pp. 1-3, retrieved from Internet: http://www.roadwarrior.com/xtend/news/pressurereleases/pr-970420.html.
Declaration of Ejaz Afzal in Oppoistion to Comarco's Motion for Preliminary Injunction, dated Apr. 30, 2003, 9 pgs. w/Exhibits 1-2 (attached).
Declaration of Ejaz Afzal in Support of Mobility Electronics, Inc.'s Motion for Summary Judgment, dated May 6, 2003, 10-pgs. w/Exhibits 1-2 (attached).
Declaration of of David Dickey in Support of Mobility Electronics, Inc.'s Motion for Summary Judgment, dated Jun. 2, 2003, 8-pgs. w/Exhibits 1-13 (attached).
Declaration of David Dickey in Opposition to Comarco's Motion for Preliminary Injunction, dated Jun. 2, 2003, 8-pgs. w/Exhibits 1-13 (attached).
IEEE Systems Readiness Technology Conference, Test Technology for the New Millennium, IEEE Catalog No. 99CH36323, Aug. 30-Sep. 2, 1999.
Instruction Manual for LNS-W Power Supply Series, Lambda Electronics Inc.
Comarco Wireless Technologies Power Products AC Adapter/Charger Program & Specification (5 pgs., 5th pg. dated Aug. 16, 1994).
Confidential Technical/Cost Proposal re: AC Power Adapter Prepared for IBM Corporation (19 pgs. 6th pg. dated Dec. 13, 1994).
Empire Engineering Confidential Disclosure Statement re: Universal Programmable DC Power Adapter dated Jan. 17, 1995; 3 pgs.
Nesco Battery Systems, SmartAdapter+ Model SA6-V21/30, 6 to 21 Volt DC Universal Adjustable DC Power Adapter Owner's Manual, 1999 (17 pgs.).
Xtend Micro Products, Inc., 50W DC Adapter Specification, Revision 1.01, (5 pgs.).
Xtend Micro Products, Inc., Assembly Drawing for Xtend Cable, Output, DC Adapter, Rev. C, (3 pgs.
Delta Air Lines, Letter to Mr. Mark Rappaport, President, Xtend Micro Products, Inc., (1 pg.).
Xtend Micro Products, Inc., Invoice for 50 Watt DC Adapter to Ingram Micro, (1 pg.).
Alpha & Omeda Semiconductor; EZBuck™ 3A Simple Buck Regulator, No. A0Z1212, (Dated: Rev. 1.5 May 2009; 18 pgs.).
European Patent Office "Extended European Search Report" Patent Application No. 10251843.8 of Comarco Wireless Technologies, Inc., dated Mar. 22, 2012, 11 pages.

* cited by examiner

POWER SUPPLY EQUIPMENT TO SIMULTANEOUSLY POWER MULTIPLE ELECTRONIC DEVICE

FIELD OF THE INVENTION

The present invention relates to power supplies, also known as power adapters and power converters. In particular, the invention concerns power supply equipment for simultaneously powering multiple electronic devices.

BACKGROUND OF THE INVENTION

Referring to FIG. 1, there is shown in block diagram form a conventional power supply used to provide DC power to portable electronic devices, such as notebook computers, cellular telephones, PDAs, MP3 players and the like. The power supply 2 is capable of receiving an input voltage from a DC power source, such as an automobile or airplane power port, as well as from an AC power source, such as a household wall outlet. Conversion circuitry 4 converts the input voltage to a DC output voltage which may be provided to a first electronic device, such as a notebook PC. The DC voltage provided to the first electronic device may be fixed in the case, for example, that the power supply 2 is dedicated for use with one model of notebook PC. Alternatively, a signal 6 may be used to program the conversion circuitry 4 to provide a particular voltage selectable from a range of output voltages. In this way, the power supply may be used with a variety of electronic devices having differing input voltage requirements. Conversion circuitry and various connector adapters, cables and switches used to program the conversion circuitry are disclosed in U.S. Pat. No. 6,693,413, the disclosure of which is incorporated herein by reference; particular reference is made to FIGS. 7A-7C; 24-40; and 51 of U.S. Pat. No. 6,693,413.

In addition to providing an operating voltage to a first electronic device, the power supply equipment may simultaneously provide an operating voltage to a second electronic device, such as a cellular telephone. A low power regulator 8 receives from the conversion circuitry 4 the voltage being generated for the first electronic device and regulates such voltage to a value used as the input voltage for the second electronic device. Regulator circuitry of this type is shown in FIG. 41 of the aforementioned U.S. Pat. No. 6,693,413. The regulator may be a separate unit from the power supply 2 or it may be housed in the same enclosure as the power supply.

A given power supply has a power rating, i.e., an amount of power (expressed in watts) which the power supply is capable of safely delivering to one or more electronic devices. To prevent a user from coupling to a power supply an electronic device which will draw power in excess of the power rating of the power supply, various connector arrangements were developed. Typically, power is transferred from the power supply to an electronic device via a cable. The far (distal) end of the cable is affixed with a connector. One of several connector adapters may be potentially mated with the cable connector. The connector adapter (also called a tip) serves as an interface between the cable connector and the electronic device. That is, a particular connector adapter is mechanically configured to mate, on one side with a particular electronic device, and on the other side with the cable connector. By use of a resistor within a connector adapter or by other techniques, the connector adapter may serve to program the power supply to produce the specific operational voltage required by the particular electronic device. Based on the programmed operational voltage and the maximum current producible by the power supply, the connector adapter can be said to have a power rating (which should meet or exceed the power requirements of the electronic device).

U.S. Pat. Nos. 6,976,885 and 7,056,149 each discloses cable connector/connector adapter assemblies in which a connector adapter is mechanically prohibited from mating with a cable connector if the power rating of the connector adapter exceeds the power rating of the cable connector, i.e., the power rating of the power supply to which the cable connector is coupled. In addition to a physical keying technique to prohibit mechanical mating of a connector adapter with underrated cable connectors (i.e., power supplies), U.S. Pat. No. 7,056,149 also employs a visual keying technique to discourage the user from attempting such improper mechanical mating in the first place.

Due to improvements in conversion circuitry technology, a power supply which generates power sufficient to run most high power consuming electronic devices, such as notebook computers, can be housed in a reasonably sized casing and provided at an attractive price. In fact, such power supplies can usually supply enough power to simultaneously power a high power consuming electronic device such as a notebook computer, and a low power consuming device, such as a cellular telephone. Powering two low power devices is likewise feasible. However, due to size, heat and cost constraints, it is not desirable to provide a power supply which can provide enough power to simultaneously power two high power devices. Nevertheless, some users will invariably attempt to use the power supply in such a manner.

To prevent a user from connecting a high power device to the low power output (provided by the regulator 8 of FIG. 1, for example), the cable connector/connector adapter assemblies of the prior art could be employed. While sufficient to prohibit the mating of an improper (overrated) connector adapter with a cable connector, such assemblies have drawbacks. For example, some users find such configurations confusing and may become discouraged enough to return the entire product when a connector adapter is not mateable with a connector. Other users will attempt to force an incompatible connector adapter onto a cable connector, thereby damaging the adapter, connector or both.

The same type of problem is encountered even if the power supply is not programmable. For example, a manufacturer may provide various models of notebook computers all of which require 16V as an input voltage and various models of low power devices, such as cellular telephones and MP3 players, all of which require 6V as an input voltage. For such product line, one configuration for a connector at the distal end of the cable can be used for all the notebook computers and such connector can be permanently affixed to the cable (assuming the power input ports of all of the notebooks have the same mechanical configuration as each other). Similarly, one configuration for a connector at the distal end of the cable can be used for all the low power devices and such connector can be permanently affixed to the cable (again assuming the power input ports for all the lower power devices have the same mechanical configuration as each other). To allow the power supply to power acceptable combinations of high power and low power devices, i.e., one high power device, one low power device; and two low power devices, the proximal end of the cables have connectors which detachably mate with connectors serving as the power output ports of the power supply. Based on prior techniques, to prevent the power supply from being used to power an unacceptable combination of devices (i.e., two high power devices), one of the power supply output ports is mechanically configured to accept a low power cable, but not accept a high power cable.

Thus, the potential problems of user confusion and damage to the connectors are still present.

Conventionally, if the power supply equipment is configured to allow a user to simultaneously couple two high power devices to the power supply, and the user does so, the power supply will shut down by operation of its overvoltage or overcurrent protection circuitry. That is, based on the load exceeding the power supply power rating, the power supply will interrupt its normal operation and enter a reset mode for a period of time. This not only presents an inconvenience to the user, it places stress on the power supply components. If such stress is repeatedly applied, for example due to the user repeatedly trying to simultaneously power two high power devices, complete failure of the power supply may result.

SUMMARY OF THE INVENTION

The present invention provides power supply equipment for simultaneously powering acceptable combinations of low and high power devices. The equipment includes two output ports, a set of low power assemblies and a set of high power assemblies. In the preferred embodiment, an assembly is comprised of a connector adapter, but proximal end connectors with associated cables may likewise be utilized. To avoid the prior art problems of user confusion and potential connector damage, each of the low power assemblies and the high power assemblies is detachably mateable to either one of the power ports.

The set of low power assemblies is configured to transfer a low DC voltage, but not a high DC voltage, from a power port to the output pin of the low power assembly for application to a low power device. Conversely, the set of high power assemblies is configured to transfer a high DC voltage, but not a low DC voltage, from a power port to the output pin of the high power assembly for application to a high power device. Based on an electrical or mechanical configuration of the assemblies, circuitry within the power supply determines whether a low power assembly or a high power assembly is mated to each power port. If low power assemblies are respectively mated between low power devices and the power ports, a respective low DC voltage is provided to each low power device. Likewise, if a low power assembly is mated between a low power device and one of the power ports, and if a high power assembly is mated between a high power device and the other power port, a low DC voltage is provided to the low power device and a high DC voltage is provided to the high power device. If a high power assembly is mated to each of the power ports, power flow is interrupted without putting the power supply in an overvoltage or overcurrent condition. In the preferred embodiment, power flow is interrupted by turning off a field effect transistor (FET) configured as a switch.

In one embodiment, each of the low DC voltages is generated by a respective regulator which receives as its input the high DC voltage. The high DC voltage is settable to a value within a range of voltages. To conserve power and lower heat dissipation, the high DC voltage is set to a low value within the range when a low power assembly is coupled to each of the power ports or when power flow is interrupted due to a high power assembly being mated to each of the power ports. In the preferred embodiment, voltage programming is used to set both the high and low DC voltages. The high DC voltage is programmed by a programming configuration of the high power assembly mated to one of the power ports. The low DC voltages are programmed by a programming configuration of the low power assemblies respectively mated to the power ports. In a second embodiment, a single regulator is used to generate one low DC voltage, and control circuitry is used to allow or interrupt power flow, depending on whether an acceptable combination of low power and high power assemblies is mated to the power ports.

DETAILED DESCRIPTION OF THE PREFERRED EMBODIMENT

Figure 2:
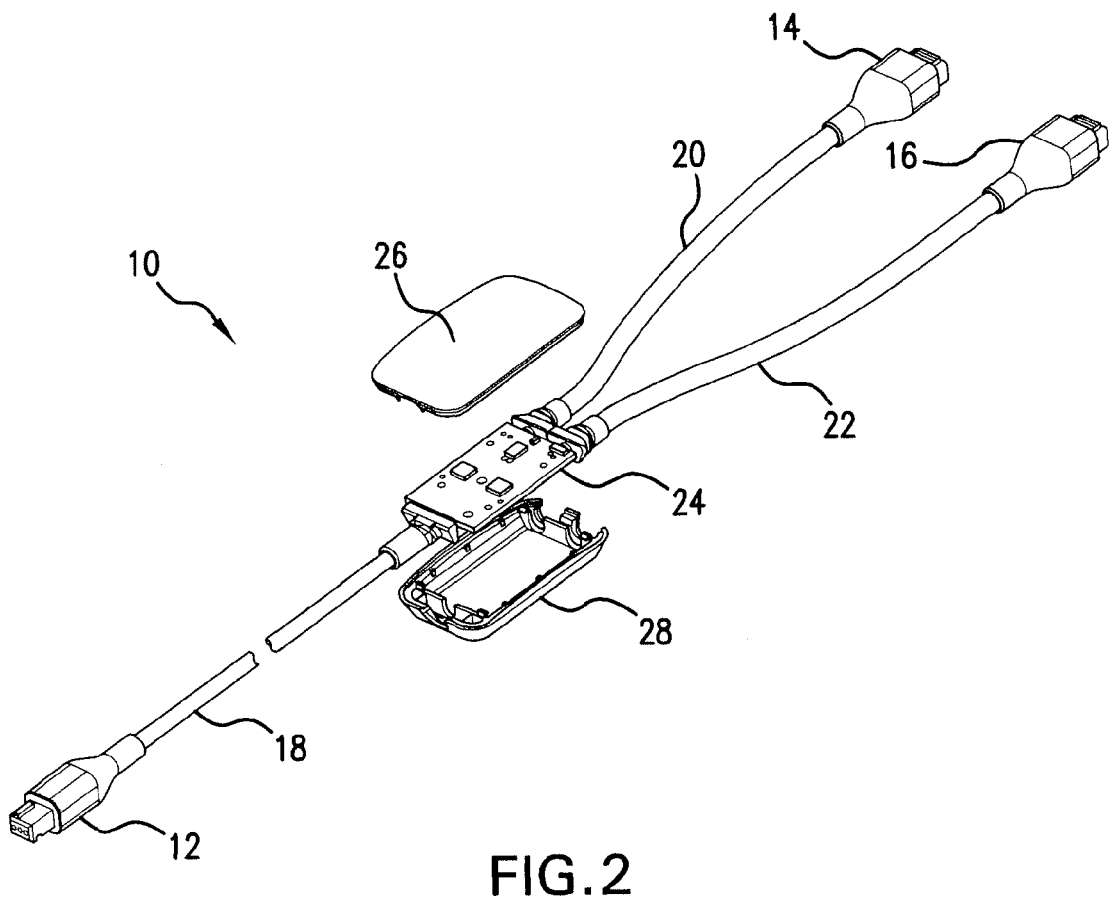
FIG. 2 is a partially expanded elevational view of the Y-cable according to an embodiment of the invention.

Referring to FIG. 2, there is shown a Y-cable 10 according to the invention. The Y-cable includes three connectors 12, 14, 16 which are coupled to a circuit board 24 via respective cables 18, 20, 22. The circuit board 24 is preferably disposed in a housing comprised of an upper casing 26 and a lower casing 28 which fit together to surround the circuit board 24.

Figure 1:
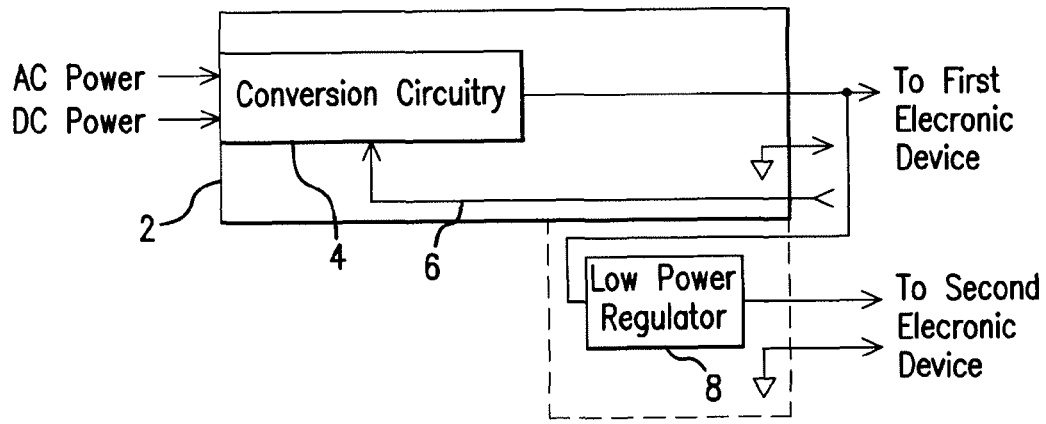
FIG. 1 is a block diagram of a conventional power supply for providing power to two electronic devices.

The Y-cable is used in conjunction with a power supply to provide power to two electronic devices simultaneously. In use, connector 12 is mated with the power output port of the power supply, for example the power supply 2 shown in FIG. 1. Schematic diagrams for such a (programmable) power supply are set forth in FIGS. 7A-7C and 51 of U.S. Pat. No. 6,693,413. Connectors 14, 16 serves as power ports. A first connector adapter is mated onto connector 14 and a second connector adapter is mated onto connector 16. The first connector adapter is mated to a first electronic device and the second connector adapter is mated to a second electronic device. Connectors 14 and 16 are mechanically the same as each other.

In the preferred embodiment of the invention, connector adapters serve not only to provide the proper mechanical interface between the power supply and the electronic device being powered, they also serve to program the power supply to generate the proper operating voltages for the devices. Accordingly, even though programmability of the power supply equipment is not a necessary feature of the invention, a description of programmability is included.

Figure 4C:
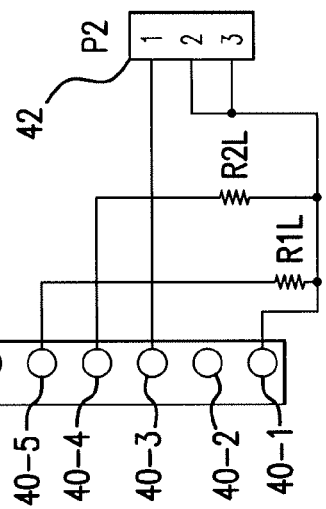
FIG. 4C is a schematic diagram for the connector adapter of FIG. 4A.
Figure 3C:
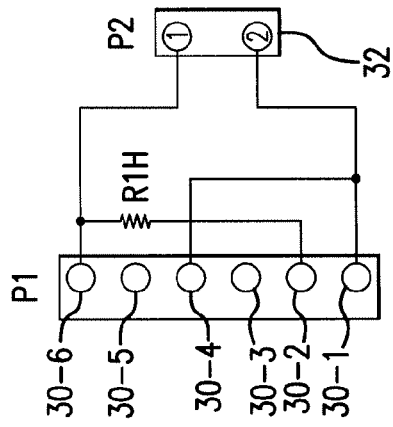
FIG. 3C is a schematic diagram for the connector adapter of FIG. 3A.
Figure 4B:
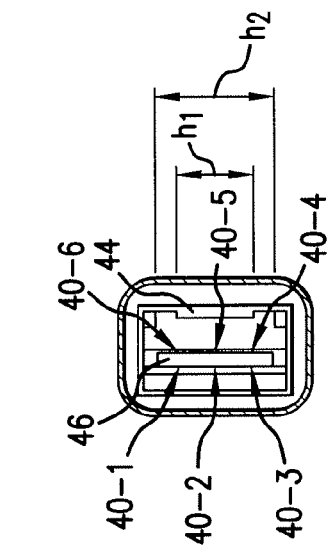
FIG. 4B is an end view of the connector adapter of FIG. 4A.
Figure 3B:
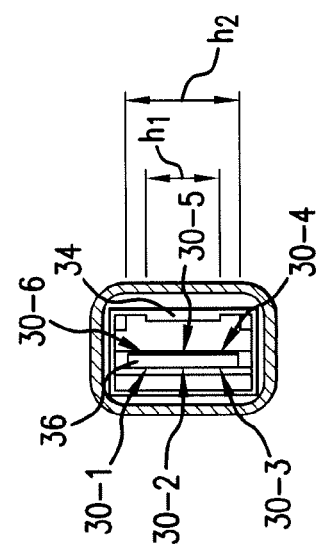
FIG. 3B is an end view of the connector adapter of FIG. 3A.
Figure 4A:
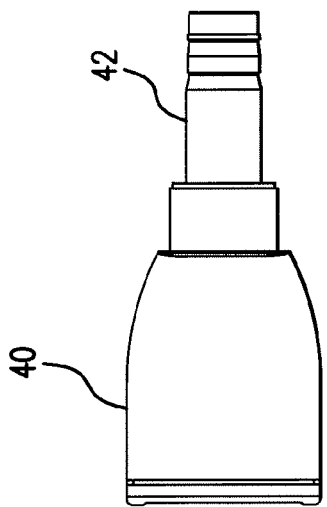
FIG. 4A is a side view of a low power connector adapter according to an embodiment of the invention.
Figure 3A:
FIG. 3A is a side view of a high power connector adapter according to an embodiment of the invention.

FIGS. 3A and 4A respectively show a high power connector adapter 30 (i.e., a connector adapter for a high power consuming electronic device) and a low power connector adapter 40 (i.e., a connector adapter for a low power consuming electronic device). The adapter 30 includes a barrel portion 32 which mechanically interfaces with a particular (model or models of a) high power electronic device. Likewise, the adapter 40 includes a barrel portion 42 which mechanically interfaces with a particular (model or models of a) low power electronic device. Barrel portions 32, 42 differ from each other as they mate with different electronic devices.

However, the portions of adapters 30, 40 which mate with connectors 14, 16 (FIG. 2) are the same as each other. Referring to FIGS. 3B and 4B, which are end views of the adapters 30 and 40, respectively, each connector adapter has six connection pins (30-1 to 30-6 in FIGS. 3B and 40-1 to 40-6 in FIG. 4B). For each adapter, the pins are spaced relative to each other and to the body of the adapter in the same manner. Likewise, a height h1 of a ledge portion 34 in adapter 30 is the same as a height h1 of a ledge portion 44 in adapter 40. The same is true for a height h2 of a ledge portion 36 in adapter 30 and a height h2 of a ledge portion 46 in adapter 40. Thus, either of the connector adapters 30, 40 may be mated with either of the connectors 14, 16 which originate from the Y-cable. This configuration avoids the prior art problems of user confusion and the damaging of a connector or a connector adapter by attempts to force fit a connector adapter onto an incompatible connector.

From an electrical point of view, however, the adapters 30 and 40 are not the same as each other. Referring to the schematic diagram of FIG. 3C, the voltage applied to the high power device arrives at pin 30-6 and is transferred, via a wire or circuit pattern, to pin 1 of barrel 32. Similarly, the return line (ground reference potential) arrives at pin 30-1 and is transferred to pin 2 of barrel 32. One end of a resistor R1H is coupled to the line carrying the voltage to the electronic device and the other end of the resistor is coupled to pin 30-2. The resistor provides a programming function. That is, the value of the resistor is recognized by the power supply as an instruction to generate a particular voltage for use by the high power device. Different connector adapters use differing values of resistors so that the voltage generated by the power supply matches the input voltage required by the electronic device.

As shown in FIG. 3C, pins 30-3 and 30-5 of adapter 30 have no connection within the adapter. For reasons explained below, pin 30-4 of adapter 30 is directly connected to ground with no intentional resistance inserted between pin 30-4 and ground.

Referring to FIG. 4C, in adapter 40, the voltage applied to the low power device arrives at pin 40-3 and is transferred to pin 1 of barrel 42. Ground potential is received at pin 40-1 and transferred to pins 2, 3 of barrel 42. In a fashion similar to adapter 30, adapter 40 includes a resistor R1L for voltage programming. In this case, the first end of resistor R1L is coupled to ground rather than to the output voltage. Pin 40-4 is coupled to ground via a resistor R2L. Thus, in adapter 40, pin 4 may be at some voltage higher than 0V (depending on the circuitry on the Y cable circuit board to which pin 4 is connected), whereas in adapter 30, pin 4 is always at 0V since it is hard wired to ground. This difference between adapters 30 and 40 is used by the Y cable to recognize adapter 30 as a high power connector adapter and adapter 40 as a low power connector adapter. In addition, the value of R2L may be used for current programming. When current programming is not utilized for the low power connector adapter, resistor R2L may be deleted so that pin 40-4 is left floating, i.e., not electrically connected to any point within adapter 40.

Figures 5A, 5B, 5C:
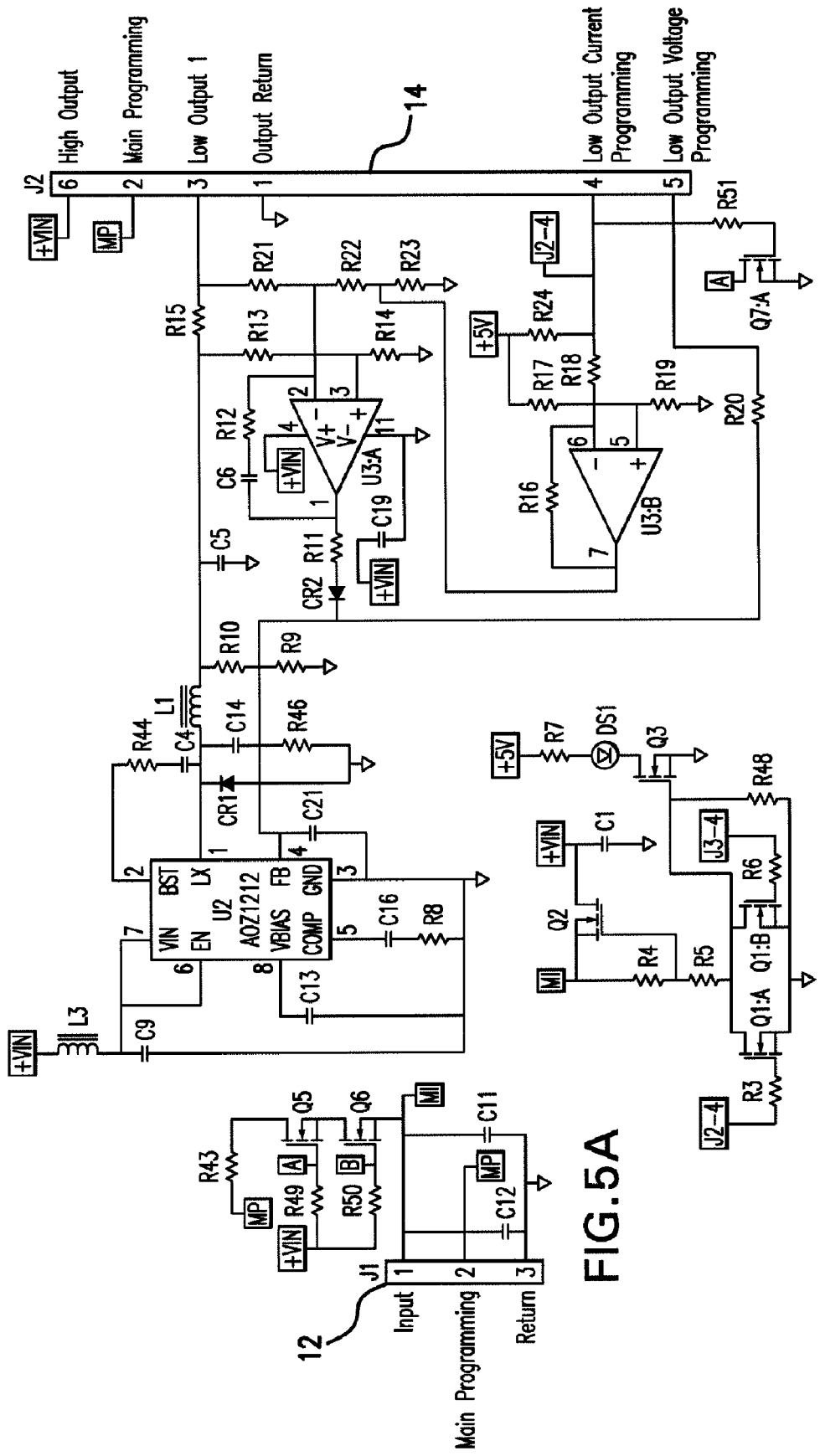
FIG. 5A is a portion of a schematic diagram for the circuitry in the Y-cable of FIG. 2.
FIG. 5B is another portion of the schematic diagram for the circuitry in the Y-cable.
FIG. 5C is another portion of the schematic diagram for the circuitry in the Y-cable.
Figure 5E:
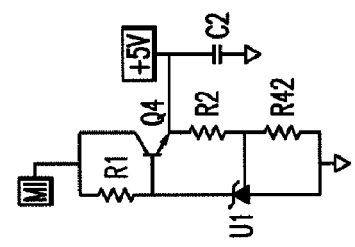
FIG. 5E is another portion of the schematic diagram for the circuitry in the Y-cable.
Figure 5D:
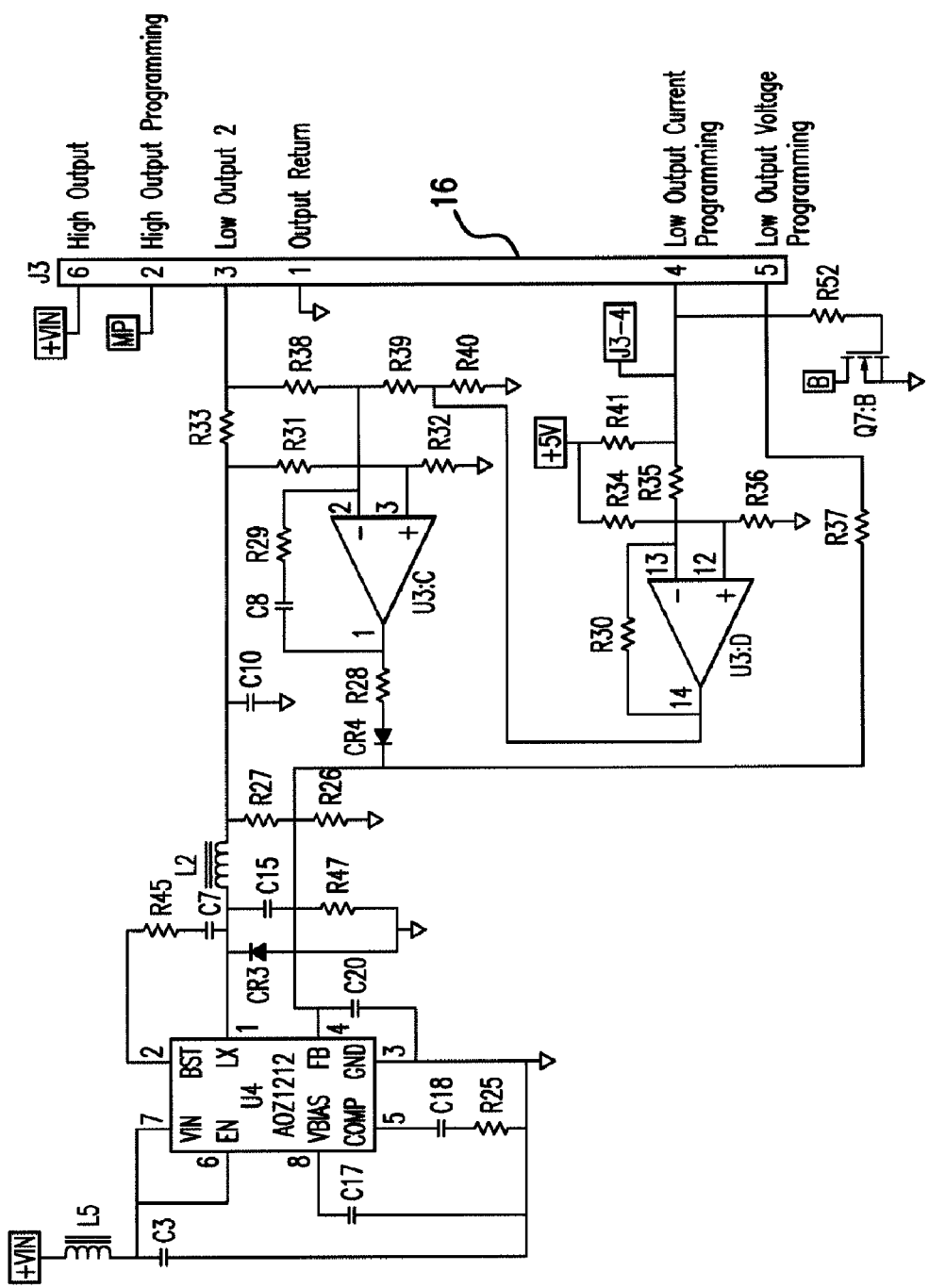
FIG. 5D is another portion of the schematic diagram for the circuitry in the Y-cable.

FIG. 5 is a schematic diagram of the circuitry contained on the circuit board 24 of the Y-cable 10 (FIG. 2). For ease of reference, the schematic diagram is depicted in five parts corresponding to FIGS. 5A-5E.

Referring to FIG. 5A, connector J1 at pin 1 receives as its input the DC voltage output by the power supply. The return line of the DC voltage is received at pin 3 of connector J1. Pin 2 of connector J1 is used to send to the power supply the main programming (MP) signal. Connector J1 corresponds to connector 12 of FIG. 2 without cable 18 being separately identified. Within FIG. 5, the line carrying the DC voltage is identified as main in (MI) and its return line is ground. Filter capacitors C11, C12 are coupled between MI and ground. The functions of the additional circuitry of FIG. 5A are described below.

FIG. 5E shows a regulator circuit which generates from MI five volts used as a reference voltage within the Y-cable. In the preferred embodiment, MI is a voltage in the range of 10-24 V, depending on the programming signal MP. The FIG. 5E regulator provides a constant 5V output over the entire range of voltage MI.

Referring to FIG. 5B, voltage MI is coupled through transistor Q2 to node VIN. Thus, if transistor Q2 is on (which is assumed for present purposes) the voltage at VIN is substantially equal to voltage MI. Referring to the top portions of FIGS. 5C and 5D, voltage VIN is output on pin 6 of each of connectors J2 and J3. Connectors J2 and J3 respectively correspond to connectors 14 and 16 of FIG. 2 without cables 20, 22 being separately identified. If a high power connector adapter 30 (FIG. 3) is coupled to connector J2 or J3, voltage VIN (MI) is applied to the corresponding high power electronic device via pin 1 of barrel 32 (FIG. 3C). Pin 2 of barrel 32 is coupled to ground via pin 1 of connector J2 or J3. The voltage programming signal, which originates at the second end of resistor R1H in cable adapter 30, is transferred to pin 2 of connector J2 or J3 and then to the power supply as signal MP (FIGS. 5C, 5D and 5A).

A high power connector adapter 30 has pin 30-4 connected directly to ground. Thus, when a high power connector adapter 30 is coupled to each of connectors J2, J3, pin 4 of J2 (J2-4) and pin 4 of J3 (J3-4) will both be at ground. Referring to FIG. 5B, when this condition occurs, N channel transistors Q1A and Q1B are both off. This condition in turn allows the voltage at the gate of P channel transistors Q2 to be sufficiently pulled up by voltage MI for transistor Q2 to turn off. Thus, in the case that a high power connector adapter is coupled to each of connectors J2 and J3, no voltage will be transferred to either high power connector adapter.

Accordingly, in the case that the user attempts to simultaneously power two high power electronic devices, power flow through the high power voltage line from the power supply (MI) will be interrupted (by transistor Q2) on its way to the high power connector adapters (VIN). Such power interruption does not rely on the overvoltage or overcurrent protection circuitry of the power supply. Referring again to FIG. 5B, when transistors Q1A and Q1B are both off (due to the presence of two high power connector adapters) the voltage at the gate of transistor Q3 will rise sufficiently so that transistor Q3 turns on. This causes LED DS1 to illuminate as an indication to the user that an improper connector adapter combination is being used.

Isolating VIN from MI by turning off transistor Q2 (of FIG. 5B) may allow VIN to drift low. In an embodiment which includes voltage programming, such condition would in turn cause signal MP to drift low since it is coupled to VIN through resistor R1H of the high power connector adapters. In the case of an inverse programming technique, a low value of MP causes the power supply to generate a high voltage. Such condition is not desirable. To prevent this condition from occurring (and for an additional reason explained below), the Y-cable includes the circuitry shown in the upper portion of FIG. 5A. In the case that VIN drifts low due to its isolation from MI, P channel transistors Q5, Q6 will both turn on, which causes main programming signal MP to be coupled to voltage MI (main in) through resistors R43. Voltage MI is still being generated by the power supply notwithstanding that it is not being provided at the outputs of the Y-cable. Resistor R43 provides a programming resistance which causes the power supply to generate a predetermined voltage at the lower end of the producible voltage range, e.g., 12V.

In a case that a high power connector adapter is mated to connector J2 14 and a low power connector adapter is mated to connector J3 16, pin J2-4 will be at ground and pin J3-4 will be at a voltage above ground because pin J3-4 is coupled to 5V through R41 (FIG. 5D). This causes transistor Q1A (of FIG. 5B) to be off, but transistor Q1B to be on. Under this condition, transistor Q2 is on so that voltage VIN is substantially equal to the main in voltage MI. Thus, the high power device receives the (programmed) voltage from the power supply via the high power connector adapter, as previously described. The same is true if a low power connector adapter is mated to connector J2 14 and a high power connector adapter is mated to connector J3 16, except that transistor Q1A is on and transistor Q1B is off. Similarly, if a high power connector adapter is mated to connector J2 and no connector adapter is mated to connector J3 (or vice versa), transistor Q2 is on so that voltage VIN (MI) is provided to a high power device via the high power connector adapter.

Referring to FIG. 5C, voltage VIN is received, via inductor L3, by integrated circuit U2, which in the preferred embodiment is an Alpha & Omega AOZ1212. This IC is a buck regulator, which in combination amplifiers U3A, U3B and associated circuitry, convert voltage VIN to the Low Output 1 voltage applied to pin 3 of connector J2 14. Via the low power connector adapter (see FIG. 4C), such voltage is applied to pin 1 of barrel 42 and in turn to a low power electronic device. In the preferred embodiment, the magnitude of the Low Output 1 voltage is programmable within a range of 0.8-8VDC. Such Low Output 1 voltage range is obtainable over the entire range of voltage VIN (10-24V in the preferred embodiment). The value of the Low Output 1 voltage within the programmable range is determined by the value of resistor R1L in the particular lower power connector adapter (FIG. 4C) to which connector J2 14 is mated. Likewise, the preferred embodiment includes current programming for the low voltages. Specifically, the maximum amount of current produced by the FIG. 5C regulator circuitry is determined by the value of resistor R2L in the particular low power connector adapter to which connector J2 14 is mated. Thus, in the preferred embodiment, resistor R2L performs two functions: i) informing the Y-cable that a low power connector adapter (as opposed to a high power connector adapter) is mated to connector J2; and ii) setting the current limit for the regulator circuitry of FIG. 5C (or FIG. 5D).

Unless transistor Q2 (FIG. 5B) is off, voltage VIN in substantially equal to the main in voltage MI. Thus, each of connectors J2 14 and J3 16 are receiving, at pin 6 thereof, the main (programmed) voltage produced by the power supply. However, when a low power connector adapter 40 (FIG. 4C) is coupled to J2 or J3, such voltage is not applied to the low power electronic device to which the connector adapter is mated since pin 6 of such connector adapter has no connection to the barrel 42.

When a low power connector adapter is coupled to each of connectors J2 and J3, the buck regulator ICs of each of FIGS. 5C and 5D function as described above with respect to FIG. 5C. Since each of the low power connector adapters include a resistor R2L, pin 4 of connector J2 (J2-4) and pin 4 of connector J3 (J3-4) will be pulled above ground because such points are respectively coupled to 5V through resistors R24, R41. This causes each of transistors Q7A (FIG. 5C) and Q7B (FIG. 5D) to turn on, thereby pulling nodes A and B low. Referring to FIG. 5A, low voltages at both nodes A and B cause both transistors Q5, Q6 to turn on. Thus, the main programming signal MP is coupled to main in voltage MI via resistor R43. As previously noted, the value of resistor R43 is selected such that the main in voltage MI from the power supply is programmed to be at the lower end of the programmable range (e.g., 12V in the preferred embodiment). Controlling the power supply to produce a voltage in lower portion of the range not only conserves power when two low power connector adapters are being utilized, it also lowers heat build up in Y-cable.

Figure 6:
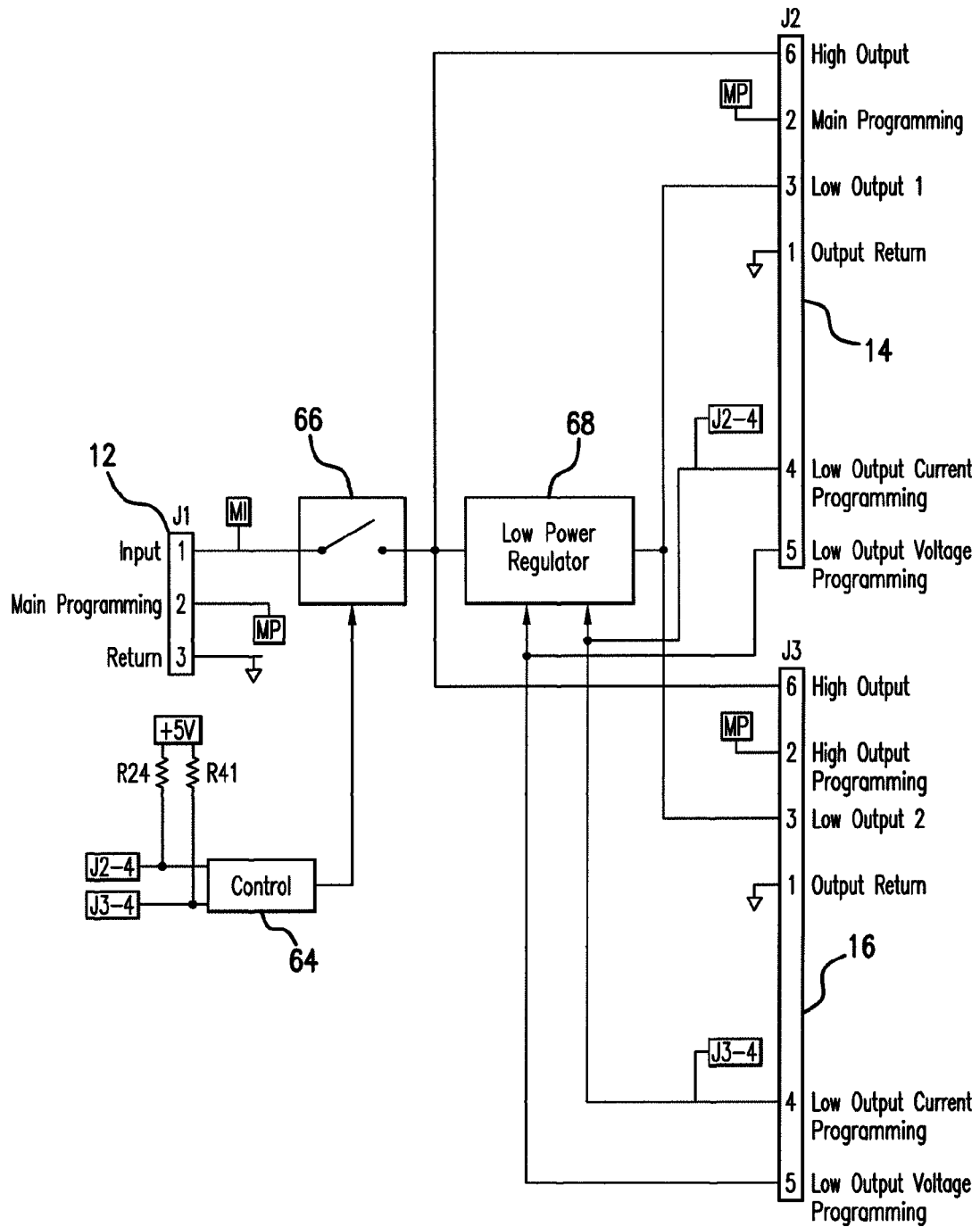
FIG. 6 is a block diagram of an alternative embodiment of the Y-cable.

FIG. 6 is a block diagram of an alternative embodiment of the Y-cable. In this embodiment, the Y-cable includes a single low power regulator 68. The main in voltage (the high DC voltage) from the power supply arrives at pin 1 of connector J1 12. The return (ground) live arrives at pin 3 of connector J1. If voltage programming is utilized for programming the high DC voltage, the main programming signal MP is provided to the power supply via pin 2 of connector J1.

If a switch 66 is closed, the main in voltage MI is provided to pin 6 of each connectors J2 14 and J3 16 and to the input of the low power regulator 68. The output of the regulator, i.e., the low DC voltage, is provided to pin 3 of each of connectors J2 and J3. If voltage programming is utilized for programming the low DC voltage, the low output voltage programming signal, provided by a low power connector adapter, is received at pin 5 of connector J2 or J3 and provided to the regulator 68. Likewise, if current programming is utilized for programming the low DC voltage, the low output current programming signal, provided by a low power connector adapter, is received at pin 4 of connector J2 or J3 and provided to the regulator 68.

In this embodiment of the Y-cable, acceptable combinations of electronic devices to be powered are: one low power device and one high power device; one low power device (no second device); and one high power device (no second device). This is the case whether or not voltage or current programming is utilized for either of the low and high DC voltages.

If a high power connector adapter (FIG. 3C) is coupled to connector J2 and a low power connector adapter (FIG. 4C) is coupled to connector J3, pin J2-4 will be at 0V and pin J3-4 will be at a voltage greater than 0V, but less than 5V. Pin J2-4 will be at 0V because it is hard wired to ground by adapter 30. Pin J3-4 will be at the intermediate voltage due to resistor R41 (FIG. 6) and resistor R2L in adapter 40 (FIG. 4C). This combination of inputs to control circuit 64 cause the circuit to output a logic "1" which in turn causes switch 66 to be closed. Thus, the main in voltage MI is transferred through switch 66, to pin 6 of connector J2, to the barrel of the high power connector adapter and to the high power electronic device. The main in voltage MI is also provided to the regulator 68 so that the regulator outputs the low DC voltage. The low DC voltage produced by the regulator 68 is provided to pin 3 of connector J3, to the barrel of the low power connector adapter and to the low power electronic device. If the high power and low power connector adapters are reversed with respect to their mating to connectors J2, J3, control circuit 64 output a logic "1" which in turn closes switch 66. The high DC voltage is applied to the high power electronic device via J3 and the low DC voltage is applied to the low power electronic device via J2.

The control circuit 64 is an exclusive OR type circuit which includes comparators to distinguish between three voltage levels of its two input signals and provide an output used to control the switch 66. As indicated above, two of the voltage levels are 0V (corresponding to a high power connector adapter) and a voltage intermediate (I), i.e., between, 0V and 5V (corresponding to a low power connector adapter). The third voltage is 5V, which corresponds to no connector adapter being coupled to J2 (or J3). Node J2-4 (J3-4) is pulled to 5V by resistor R24 (R41) (FIG. 6) and the node is not pulled toward ground because there is no connector adapter to do so.

The output (as a logic "0" or "1") of control circuit 64 as a function of the J2-4, J3-4 voltages of 0, I or 5 volts is shown by the following table:

| J3-4(V) | J2-4(V) | Output (Logic Level) |
|---------|---------|----------------------|
| 0 | 0 | 0 |
| 0 | I | 1 |
| I | 0 | 1 |
| 0 | 5 | 1 |
| 5 | 0 | 1 |
| I | I | 0 |
| I | 5 | 1 |
| 5 | I | 1 |
| I | I | 0 |
| 5 | 5 | 0 |

Thus, as previously explained, if one high power and one low power connector adapter are mated to J2, J3, the switch 66 is closed. Likewise, if one high power connector adapter (or one low power connector adapter) is mated to one of the power ports and the other power port is not mated to a connector adapter, the switch 66 is closed. However, the switch 66 is open if the power ports are mated to: i) two high power connector adapters; ii) two low power connector adapters; or iii) no connector adapters at all. As shown in FIG. 5B, control circuit 64 can be utilized to enable a LED to indicate that the combination of adapters coupled to the power ports has resulted in the interruption of power flow through the Y-cable.

In the above description, the Y-cable 10 is external to the power supply. However, the invention is equally applicable to a configuration in which the Y-cable circuitry is included within the power supply. That is, a single power supply enclosure contains all of the conversion circuitry including the regulators and related circuitry of FIG. 5 or 6. In such configuration, cable 18 and connector 12 are not utilized. Cables 20 and 22 are configured with proximal end connectors which detachable mate with connectors disposed at an edge of the power supply enclosure.

As previously indicated, programmability of either the main voltage or the low output voltage is not a necessary feature of the invention. In the case of fixed high and low voltages, connector adapters are not required if the intended high power devices all have the same power input port mechanical configuration as each other, and the intended low power devices all have the same power input port mechanical configuration as each other. In such case, the interconnections, or the lack thereof, with or without resistors, used to indicate to the power supply whether a high power or low power device is intended to be coupled to a particular port are made in the connectors (or cables affixed thereto) which mate at their proximal end with the Y cable circuit board 24 connectors (or mate to connectors disposed at an edge of the power supply enclosure in a configuration in which the Y-cable circuitry is disposed within the same enclosure as the main power supply). That is, in such a case, proximal end connectors and associated cables, rather than cable adapters, serve as either low power assemblies or as high power assemblies. The output ports are the connectors to which such proximal end connectors mate.

Low power and high power assemblies, whether or not including programming functions, can have a mechanical configuration which indicates to a connector mated thereto whether such assembly is a high power assembly or a low power assembly. For example, a high power connector adapter may have a tab(s) disposed in a certain location, while a low power connector adapter has a channel(s) in the same location. The tab pushes a flexible conductor in a mated connector to close a circuit, while the channel allows the circuit to remain open. The power supply interprets the closed circuit on the connector as meaning that the connector is mated with a high power connector adapter and interprets the open circuit on the connector as meaning that the connector is mated with a low power connector adapter.

The preferred embodiment was described with respect to high power and low power considerations. Nevertheless, additional power level ranges, e.g., low, mid and high power ranges are within the scope of the invention. Likewise, power supply equipment for simultaneously powering more than two electronic devices is within the scope of the invention.

Other modifications to the preferred embodiment may be similarly made without departing from the spirit of the invention. The disclosed embodiments are therefore to be considered as illustrative and not restrictive. The scope of the invention is indicated by the following claims, rather than by the foregoing description. All modifications which come within the meaning and range of equivalency of the claims are intended to be included therein.

The invention claimed is:

1. Power supply equipment comprising:
conversion circuitry for converting an input voltage to a high DC voltage and to first and second low DC voltages;
a first power port operative to receive the high DC voltage at a first pin of the first power port and the first low DC voltage at a second pin of the first power port for output to an assembly;
a second power port operative to receive the high DC voltage at a first pin of the second power port and the second low DC voltage at a second pin of the second power port for output to an assembly;
at least one low power assembly which is detachably mateable between a corresponding low power electronic device and either of the first and second power ports;
at least two high power assemblies, each of the high power assemblies being detachably mateable between corresponding high power electronic devices and either of the first and second power ports, each of the high power assemblies having a high power configuration which identifies the assembly as a high power assembly; and
circuitry, responsive to the high power configuration of the high power assemblies, for preventing the high power electronic devices from receiving the high DC voltage when a high power assembly is mated to each of the first and second power ports, without putting the conversion circuitry in an overvoltage or overcurrent condition.

2. The power supply equipment of claim 1, wherein the circuitry includes:
a switch which when closed couples the high DC voltage to at least one of the first and second power ports; and a control circuit which reads the high power configuration and causes the switch to open in response to a high power assembly being mated to each of the first and second power ports.

3. The power supply equipment of claim 2, wherein the high power configuration is an electrical configuration.

4. The power supply equipment of claim 3, wherein the electrical configuration is a connection of a particular pin of the high power assemblies directly to ground.

5. The power supply equipment of claim 1, wherein when a high power assembly is mated between the first power port and a high power electronic device, the high DC voltage is applied to the high power electronic device, both in a first case that the second power port is mated with a low power assembly and in a second case that the second power port is not mated with an assembly.

6. The power supply equipment of claim 5, wherein when a high power assembly is mated between the first power port and a high power electronic device, the high DC voltage is applied to the high power electronic device, and when simultaneously a low power assembly is mated between the second power port and a low power electronic device, the second low DC voltage is applied to the low power electronic device.

7. The power supply equipment of claim 6, wherein when a first low power assembly is mated between the first power port and a first low power electronic device, the first low DC voltage is applied to the first low power electronic device, and when simultaneously a second low power assembly is mated between the second power port and a second low power electronic device, the second low DC voltage is applied to the second low power electronic device.

8. The power supply equipment of claim 1, wherein
each of the high power assemblies has a first pin which is electrically coupled to the first pin of a mated power port to receive the high DC voltage and includes circuitry to transfer the high DC voltage to an output pin of the high power assembly for application to a high power device, and
each of the low power assemblies has a first pin which is electrically coupled to the first pin of a mated power port, wherein the first pin of the low power assembly has no electrical connection to an output pin of the low power assembly.

9. The power supply equipment of claim 8, wherein
each of the low power assemblies has a second pin which is electrically coupled to the second pin of a mated power port to receive the first or second low DC voltage and includes circuitry to transfer the received low DC voltage to the output pin of the low power assembly for application to a low power device, and
each of the high power assemblies has a second pin which is electrically coupled to the second pin of a mated power port, wherein the second pin of the high power assembly has no electrical connection to the output pin of the high power assembly.

10. The power supply equipment of claim 1, wherein each of the first and second low DC voltages is generated by a respective regulator which receives as its input the high DC voltage.

11. The power supply equipment of claim 10, wherein the conversion circuitry is capable of generating the high DC voltage over a range of DC voltages and sets the high DC voltage at the low end of the range in response to respective low power assemblies being mated to each of the first and second power ports.

12. The power supply equipment of claim 1, wherein the conversion circuitry is capable of generating the high DC voltage over a range of DC voltages and, in a case that respective high power assemblies are mated to each of the first and second power ports, sets the high DC voltage to a predetermined DC voltage within the range.

13. The power supply equipment of claim 12, wherein in a case that a high power assembly is mated to only one of the first and second power ports, the conversion circuitry sets the high DC voltage at a programmed DC voltage within the range based on a voltage programming configuration of the high power assembly mated to the one power port.

14. The power supply equipment of claim 1, wherein each of the first and second low DC voltages is programmable within a range, and in a case that first and second low power assemblies are respectively mated to the first and second power ports, the conversion circuitry sets the first low DC voltage to a first programmed voltage within the range based on a voltage programming configuration of the first low power assembly and sets the second low DC voltage to a second programmed voltage within the range based on a voltage programming configuration of the second low power assembly.

15. Power supply equipment comprising:
an input terminal to receive a high DC voltage;
conversion circuitry for converting the high DC voltage to first and second low DC voltages;
a first power port operative to receive the high DC voltage at a first pin of the first power port and the first low DC voltage at a second pin of the first power port, the first power port being mateable one at a time to each of low power assemblies and high power assemblies;
a second power port operative to receive the high DC voltage at a first pin of the second power port and the second low DC voltage at a second pin of the second power port, the second power port being mateable one at a time to each of the low power assemblies and the high power assemblies; and
a switch which when closed couples the high DC voltage to at least one of the first and second power ports, and, in response to a high power configuration of the high power assemblies, opens when a high power assembly is mated to each of the first and second power ports.

16. Power supply equipment comprising:
an input terminal to receive a high DC voltage;
conversion circuitry for converting the high DC voltage to a low DC voltage;
a first power port operative to receive the high DC voltage at a first pin of the first power port and the low DC voltage at a second pin of the first power port, the first power port being mateable one at a time to each of low power assemblies and high power assemblies;
a second power port operative to receive the high DC voltage at a first pin of the second power port and the low DC voltage at a second pin of the second power port, the second power port being mateable one at a time to each of the low power assemblies and the high power assemblies; and
circuitry, responsive to a low power configuration of the low power assemblies and a high power configuration of the high power assemblies being mated to the first and second power ports, to apply the high DC voltage to the first pin of at least one of the first and second power ports and to apply the low DC voltage to the second pin of at least one of the first and second power ports when a high power assembly and a low power assembly are mated to the first and second power ports, and which prevents application of the high DC voltage to the first pin of both the first power port and the second power port when a high power assembly is mated to each of the first and second power ports.

17. The power supply equipment of claim 16, wherein the circuitry prevents application of the low DC voltage to the second pin of both the first power port and the second power port when a low power assembly is mated to each of the first and second power ports.

18. Power supply equipment comprising:
conversion circuitry for converting an input voltage to a high DC voltage and a low DC voltage;
a first power port operative to receive the high DC voltage at a first pin of the first power port and the low DC voltage at a second pin of the first power port, the first power port being mateable one at a time to each of low power assemblies and high power assemblies;
a second power port operative to receive the high DC voltage at a first pin of the second power port and the low DC voltage at a second pin of the second power port, the second power port being mateable one at a time to each of the low power assemblies and the high power assemblies; and
circuitry, responsive to a low power configuration of the low power assemblies and a high power configuration of the high power assemblies being mated to the first and second power ports, to apply the high DC voltage to the first pin of at least one of the first and second power ports and to apply the low DC voltage to the second pin of at least one of the first and second power ports when a high power assembly and a low power assembly are mated to the first and second power ports, and which prevents application of the high DC voltage to the first pin of both the first power port and the second power port when a high power assembly is mated to each of the first and second power ports.

19. The power supply equipment of claim 18, wherein the circuitry prevents application of the low DC voltage to the second pin of both the first power port and the second power port when a low power assembly is mated to each of the first and second power ports.

* * * * *